United States Patent
Zhang et al.

(10) Patent No.: US 9,846,059 B2
(45) Date of Patent: Dec. 19, 2017

(54) NONVOLATILE ROTATION SENSOR WITH MAGNETIC PARTICLE IN SERPENTINE TRACK

(71) Applicant: Teleldyne Scientific & Imaging, LLC., Thousand Oaks, CA (US)

(72) Inventors: Weiya Zhang, Thousand Oaks, CA (US); Brian Gregory, Newbury Park, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 216 days.

(21) Appl. No.: 14/705,164

(22) Filed: May 6, 2015

(65) Prior Publication Data

US 2016/0327412 A1    Nov. 10, 2016

(51) Int. Cl.
| | |
|---|---|
| *G01D 5/20* | (2006.01) |
| *G01D 5/245* | (2006.01) |
| *G01D 5/165* | (2006.01) |
| *G01D 5/24* | (2006.01) |

(52) U.S. Cl.
CPC ........... *G01D 5/2454* (2013.01); *G01D 5/165* (2013.01); *G01D 5/2046* (2013.01); *G01D 5/2053* (2013.01); *G01D 5/2405* (2013.01)

(58) Field of Classification Search
None
See application file for complete search history.

(56) References Cited

U.S. PATENT DOCUMENTS

| | | | |
|---|---|---|---|
| 3,382,349 A | 5/1968 | Lester | |
| 4,990,909 A | 2/1991 | Ueda et al. | |
| 8,466,672 B2 * | 6/2013 | Dixon | G01D 5/145 |
| | | | 324/167 |
| 2002/0105321 A1 * | 8/2002 | Spellman | G01D 5/04 |
| | | | 324/207.22 |
| 2003/0218458 A1 | 11/2003 | Seger et al. | |
| 2013/0169270 A1 * | 7/2013 | Delbaere | G01D 5/24409 |
| | | | 324/207.25 |
| 2016/0327413 A1 * | 11/2016 | Gregory | G01D 5/165 |

OTHER PUBLICATIONS

Extended European Search Report dated Oct. 28, 2016; Application No. 16166105.3—(6) pages.

* cited by examiner

*Primary Examiner* — Melissa Koval
*Assistant Examiner* — Felicia Farrow
(74) *Attorney, Agent, or Firm* — Boyle Fredrickson, SC

(57) ABSTRACT

A nonvolatile, absolute multi-turn rotation sensor employs a magnetic particle that is indexed around a serpentine channel with successive passes of a magnet caused by rotation of the rotation sensor shaft. Sensors at regular locations around the track allow determination of the position of the magnetic particle and thus the total number of revolutions of the shaft.

20 Claims, 5 Drawing Sheets

NONVOLATILE ROTATION SENSOR WITH MAGNETIC PARTICLE IN SERPENTINE TRACK

STATEMENT REGARDING FEDERALLY SPONSORED RESEARCH OR DEVELOPMENT

—

CROSS REFERENCE TO RELATED APPLICATION

—

BACKGROUND OF THE INVENTION

The present invention relates to rotation sensors and in particular to multi-turn rotation sensors that can output absolute angular position over a rotational range of greater than 360 degrees.

Rotation sensors including encoders, resolvers and the like, are electromechanical devices providing an electrical output indicating the position of a rotatable shaft. A common type of rotation sensor uses a disk-shaped rotor having an optically readable pattern marked on its surface, the pattern thrilling alternating opaque and transmissive frames. These frames are illuminated from one side by a lamp and light traveling from the lamp through the opaque and transmissive frames of the rotor and then through similar frames in a stationary stator, to be detected by one or more stationary photodetectors. Rotation of the shaft moves the rotor which in turn causes a fluctuation in the light transmitted through the rotor and stator thus producing a signal that may be decoded into a digital indication of shaft movement.

Rotation sensors may be classified as absolute rotation sensors or incremental rotation sensors. Incremental rotation sensors provide only an indication of the change in position of the sensor shaft. In incremental rotation sensors, the rotor normally contains a uniform periodic pattern whose movement past a photodetector creates an index signal indicative of the amount that the shaft has rotated. A separate track may also provide a zero signal for particular angular position. In some cases, one or more photodetectors arranged with an offset of 90 degrees ("quadrature") provide an indication of the direction of rotation as well as the amount of rotation of the shaft, as is understood in the art.

Absolute rotation sensors, in contrast to incremental rotation sensors, produce a unique value (typically a digital code word) for each rotation sensor position. The rotor of an absolute rotation sensor may carry a series of concentric tracks whose opaque and transmissive segments, examined along a line of radius, reveal a binary or Grey code value indicative of shaft position. Each track provides the value of one bit and is read by a separate photodetector to produce an output digital word.

Often it is desired to have an absolute measure of rotary position over multiple turns (that is, a measurement that spans an angular range of greater than 360 degrees). This can be done using an absolute single-turn rotation sensor by adding an electronic counter that counts each time the value from the rotation sensor "rolls over" from its maximum value to zero. Precise angular position over multiple turns may be done by adding the output from the absolute single-turn rotation sensor to the value of the counter times 360 degrees.

The use of an electronic counter can cause the absolute angular position to be lost in the event of a power failure which causes the electronic counter to reset. In order to create a "non-volatile" multi-turn absolute rotational rotation sensor, a single-turn rotation sensor can be combined with a mechanical counter such as provided by a gear train. In one design, successive gears in the gear train are attached to simple, absolute rotation sensors that provide successive bits in a count value. For example, each gear in the gear train may provide a 2:1 reduction and may incorporate a single bit, absolute rotation sensor. Each rotation sensor then provides a separate binary digit of a count value.

Two alternative approaches use either a battery or electricity developed by Wiegand wires to write to a nonvolatile memory.

The addition of mechanical gear systems, multiple rotation sensors, batteries, or power generation systems to an absolute single-turn rotation sensor to provide multi-turn capability greatly increases the cost, complexity and potential for failure of the resulting rotation sensor.

SUMMARY OF THE INVENTION

The present invention provides a non-volatile, absolute rotation sensor that the problems of the above-described prior art systems by using a magnetic particle constrained in a serpentine path about the rotor shaft. Rotation of the shaft by 360 degrees exposes the magnetic particle to a reciprocating magnetic field that causes the magnetic particle to incrementally and predictably advance along the track. Sensors on the track can then be used to deduce the number of turns of the shaft based on the position of the magnetic particle in the track. In some embodiments, an angular resolution less than a full turn can be obtained in distinction from prior art systems.

In one embodiment, the invention provides a rotation sensor having a housing and a shaft supported by the housing to rotate about an axis. A magnetic particle is constrained within a track constraining the magnetic particle for movement therealong. The track is positioned about the axis and provides serpentine periodic variations in radius from the axis so that the magnetic particle moving through the track about the axis moves closer to and further from the axis with such movement. A permanent magnet is positioned adjacent to the track and the track and permanent magnet adapt to rotate relative to each other about the axis with rotation of the shaft to expose the magnetic particle to a magnetic field which has to radically oscillating component. The combined effect of the magnetic force and the constraint force from the track causes the magnetic particle to advance a predetermined amount along the track with each rotation of the shaft. A sensor system identifies a location of the magnetic particle along the track to output a number of turns of the shaft according to a position of the magnetic particle along the track.

It is thus a feature of at least one embodiment of the invention to provide a nonvolatile method of tracking the number of turns made by a shaft rotation sensor without using mechanical gearing or the like.

The permanent magnet may be a magnetic ring mounted eccentrically with respect to the track so that a portion of the magnetic ring passes from a radially outward position to a radially inward position with respect to a given location on the track as the shaft rotates.

It is thus a feature of at least one embodiment of the invention to provide a simple method of generating a radially oscillating magnetic field that may be easily dynamically balanced.

The permanent magnet may provide periodically extending radial teeth exerting a tangential force on the magnetic particle in the track when the teeth pass the magnetic particle with rotation of the shaft. The permanent magnet may also provide a spatial distribution of magnetization to exert a tangential force on the magnetic particle in the track when passing the magnetic particle with rotation of the shaft.

It is thus a feature of at least one embodiment of the invention to provide a mechanism to ensure the direction of the magnetic particle corresponds to the rotation of the shaft so as to provide a system that is bidirectional in operation.

The magnetic particle may be any of a ferromagnetic bead, a droplet of ferrofluid, and a droplet of ferrofluid surrounding a magnetized bead.

It is thus a feature of at least one embodiment of the invention to provide a magnetic particle that may be of arbitrary size and scale so that the present invention may be realized as a micro-electromechanical device.

The serpentine track may be a substantially sinusoidal path along a circle lying in a plane perpendicular to the axis.

It is thus a feature of at least one embodiment of the invention to provide a track reducing "jerk" on the magnetic particle being a derivative of acceleration such as may promote wear and vibration.

The sensors may be any of optical, resistive, capacitive, or inductive sensors.

It is thus a feature of at least one embodiment of the invention to provide a system that may work with a wide variety of well-established sensor types.

The sensor may be a noncontact electrical field sensor.

It is thus a feature of at least one embodiment of the invention to permit the magnetic particle to be fully isolated from other components for reduced risk of contamination.

The rotation sensor may include a second magnetic particle and a second track constraining the second magnetic particle and concentric with the track, the second track providing a serpentine periodic variation in radius from the axis so that the second magnetic particle moving to the second track about the axis moves closer to and further from the axis with such movement. The sensor system may identify a location of the second magnetic particle along the second track to reveal a number of turns of the shaft according to a position of the second magnetic particle along the second track. The system may further include more magnetic particles and serpentine tracks.

It is thus a feature of at least one embodiment of the invention to provide an extended range of rotational measurements by taking advantage of the large modulus available using two serpentine tracks that "roll-over" at different rotation numbers that are not factors of each other as will be discussed in more detail below. The sensor system may provide electrical output differentiating at least two angular positions of the shaft within the range of 360 degrees.

It is thus a feature of at least one embodiment of the invention to provide rotation sensor system that may also indicate different positions within a single-turn.

The sensor system may provide periodic sensor elements at locations associated with each periodic variation in the radius of the track to identify a location of the magnetic particle at any of such location.

It is thus a feature of at least one embodiment of the invention to permit instantaneous determination of shaft rotation counts, for example, from a power-up state, without the need to rotate the shaft.

The sensor may provide a continuous output indicating the position of the magnetic particle within one cycle of the serpentine periodicity.

It is thus a feature of at least one embodiment of the invention to provide discrimination between different angles within a single turn of the rotation sensor.

The track may be a channel constraining the magnetic particle to move along the channel.

It is thus a feature of at least one embodiment of the invention to provide a simple structure that can be implemented, for example, using MEMS and microfluidics fabrication technologies that are compatible to the semiconductor device fabrication process.

When the shaft is fixed in position, the magnetic particle may be stably held in a single location along the track by a magnetic field.

It is thus a feature of one embodiment of the invention to provide a system that resists vibration by locking the magnetic particle to the shaft through magnetic action.

These particular objects and advantages may apply to only some embodiments falling within the claims and thus do not define the scope of the invention.

DETAILED DESCRIPTION OF THE PREFERRED EMBODIMENT

Figure 1:
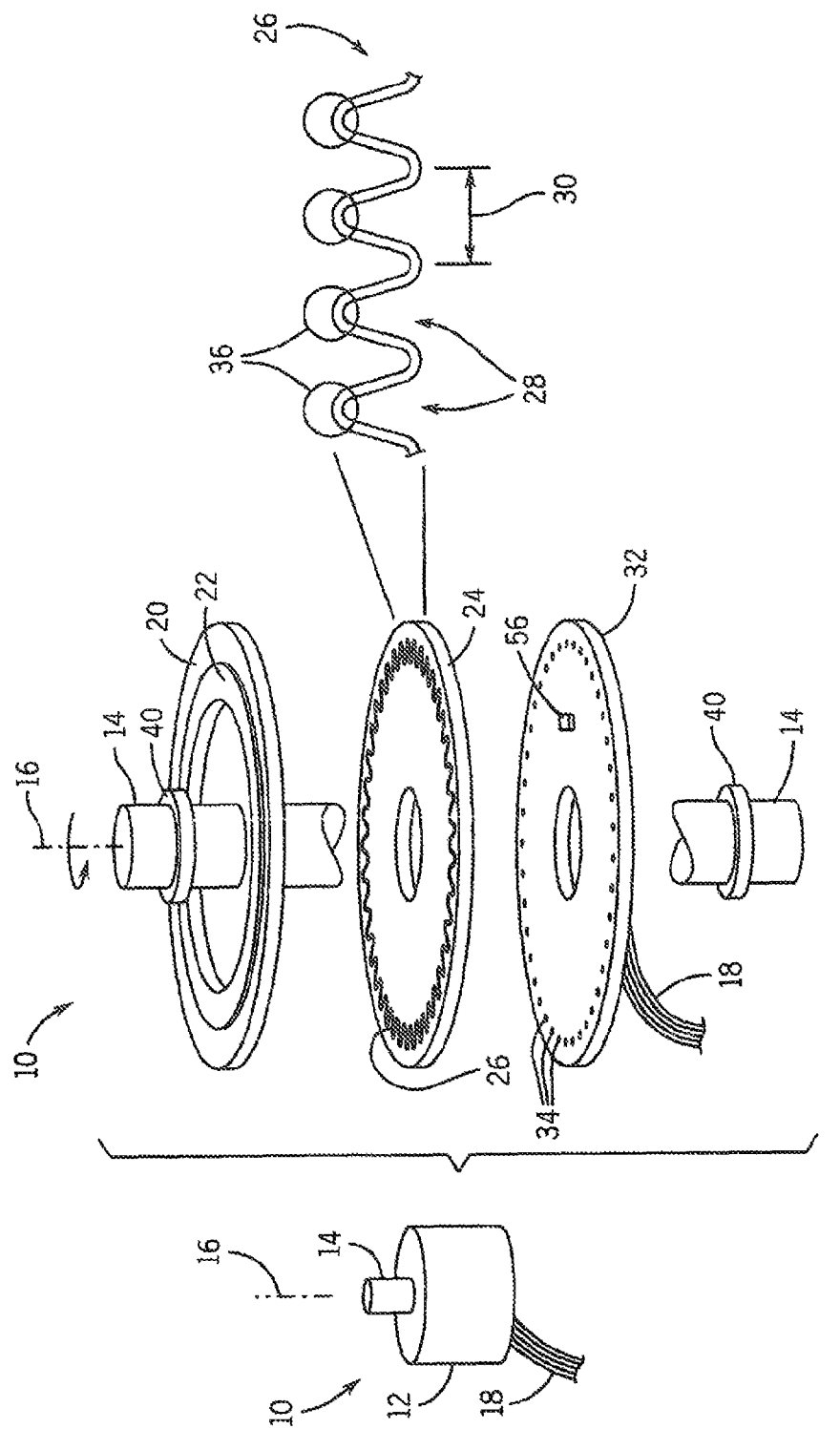
FIG. 1 is a simplified perspective view of an rotation sensor according to one embodiment of the present invention also shown in exploded view with the housing removed to reveal a rotating magnet ring and fixed track and providing a detail of a track for holding a magnetic particle within the rotation sensor.

Referring now to FIG. 1, a rotation sensor 10 per the present invention may provide a housing 12 through which a shaft 14 may project. The shaft 14 extends through the housing 12 and is supported by the housing 12 to rotate about an axis 16 with respect to the housing 12. Electrical conductors 18 may extend from the housing 12 providing the electrical signals indicating an absolute rotary angle of the shaft 14 with respect to the housing 12.

Within the housing 12, the shaft 14 may attach to a first magnet disk 20 extending in a plane generally perpendicular to the axis 16 and supporting thereon a magnetic ring 22 of a magnetized permanent magnet material. As will be discussed further below, in one embodiment, the magnet ring 22 is circular and is mounted eccentrically so that its center is not aligned with the axis 16.

Positioned adjacent to the magnet disk 20 is a track disk 24 also extending in a plane generally perpendicular to the axis 16 but fixed with respect to the housing 12. The track disk 24 may hold a serpentine track 26 generally extending in a circle about the axis 16 but having radial perturbations 28, for example, in the form of sinusoidal variations in the track radius so that the track moves radially outwardly and inwardly at regular periodic angular intervals 30 toward and away from the axis 16 as measured along lines of the radius perpendicular to axis 16.

Positioned adjacent to the track disk 24, on one or both sides of the track disk 24, may be at least, one sensor disk 32. The sensor disk 32 provides multiple sensors 34 associated with sensing locations 36 periodically spaced along the serpentine track 26, for example, with one sensing location 36 for with each perturbation 28 of the serpentine track 26 at each interval 30. As shown, and in one embodiment, each sensing location 36 spans one full cycle of perturbation 28 between peaks of maximum radius along the serpentine track 26, although other regular locations may be chosen. Desirably, the sensor locations 36 fit against the adjacent sensor locations 36 without substantial gap so that the magnetic particle 48 (discussed below) may be sensed at any location.

Figure 8:
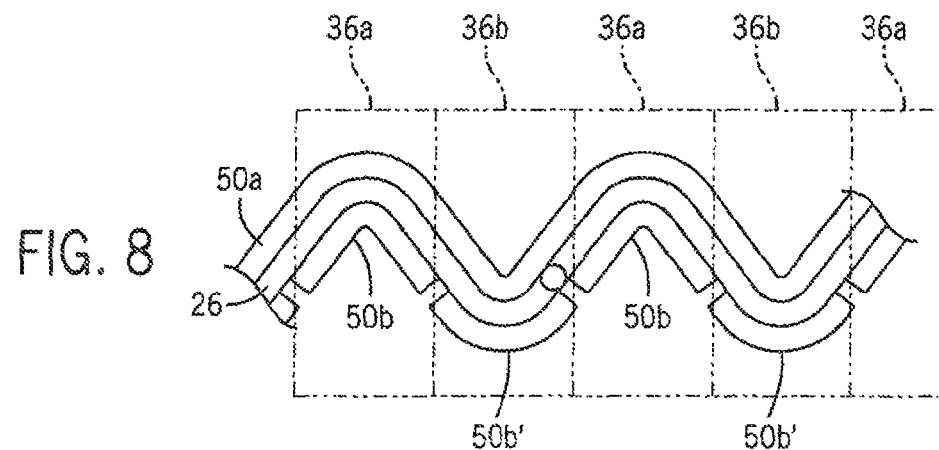
FIG. 8 is a figure similar to FIG. 3 showing physical placement of the electrodes for sensing the position of a magnetic particle at any location along a serpentine track with a resolution that addresses the zones of uncertainty shown in FIG. 6.

Alternatively, the sensors may be placed directly on the track disk 24, for example, to flank either side of the serpentine track 26 as will be discussed below with respect to FIGS. 8 and 9.

The shaft 14 may be supported at opposite ends by rotary bearings 40 as is generally understood in the art.

Figure 2:
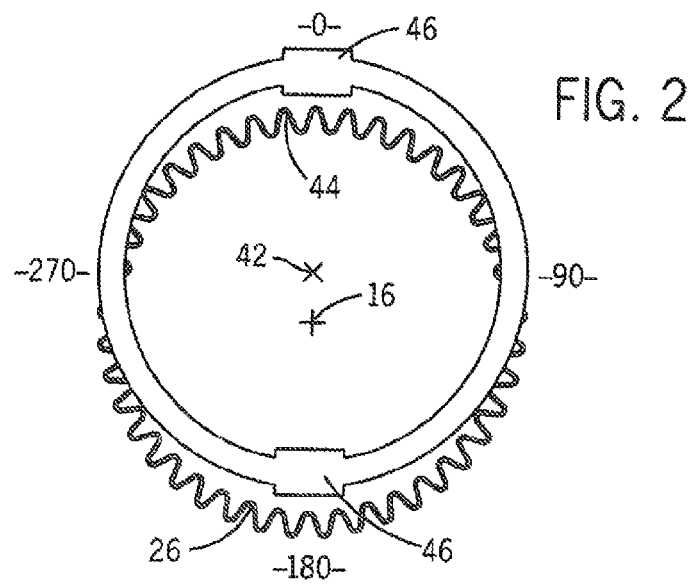
FIG. 2 is a simplified top plan view of the magnetic ring and rotary track at a relative angular position of zero degrees.

Referring now to FIG. 2, as noted, the magnet ring 22 may have a center point 42 displaced with respect to the axis 16 so that the magnet ring 22 is eccentric with respect to the mounting of the track 26. The eccentricity is chosen so that the magnet ring 22 with rotation of the shaft 14 moves between positions outside and inside a given location of the track 26. Thus for example, at an arbitrarily chosen zero relative position of the magnet ring 22 with respect to the track 26, the magnet ring 22 will be radially outward but adjacent to a given position 44 on the ring 22. As the shaft 14 rotates and the ring 22 moves with it, the magnet ring 22 will pass inward over the given position 44 when the magnet ring moves to a 90-degree position relative to the track 26. When the magnet ring 22 moves to 180 degrees with respect to the track 26, the magnet ring 22 will be radially inward with respect to the given position 44, that is, inside the track 26 with respect to the axis 16. Finally, the magnet ring 22 will pass outward over the given position 44 when the magnet ring 22 moves to a 270 degree offset with respect to the track 26.

In one embodiment, the magnet ring 22 includes two radially inwardly projecting teeth 46 positioned in 180-degree opposition along the magnet ring 22 to slightly overlap the given position 44 on the track 26 when the magnet ring is in the zero degree and 180-degree positions, respectively.

Figure 3A:
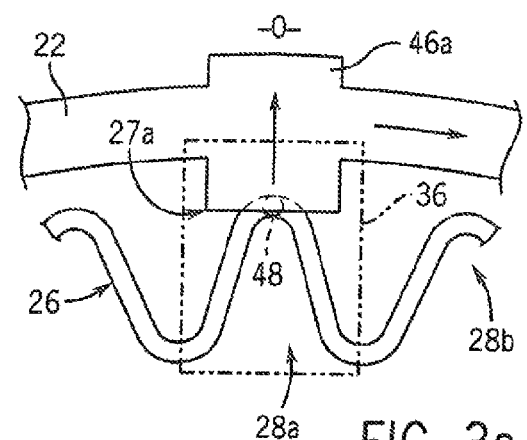
FIGS. 3a-3e are fragmentary representations of the track of FIG. 2 with the magnet ring at various angular locations showing interaction of the magnet ring and a magnetic particle in the track to move the magnetic particle at regular increments with each rotation of the shaft.

Referring now to FIG. 3a, when the magnet ring 22 is in the zero degree position, as discussed above, a magnetic particle 48, for example, of a solid ferrous material, a ferrofluid, or a solid permanent magnet coated with ferrofluid material, may be held against movement by vibration at a radially outward peak 27a of a given perturbation 28a attracted to the magnet ring 22 and the tooth 46 closely adjacent to the track 26. As so held, the magnetic particle 48 is positioned within a sensing location 36. The magnetic particle 48 is practically immobilized in the track 26 by the magnetic attraction of the ring 22 and the constraining effect of the track 26 to be resistant to movement by vibration. In this example, the track 26 may be a closed channel in which the magnetic particle 48 may move freely along the groove but is constrained by lateral groove walls and protected from external contamination.

Figure 3B:
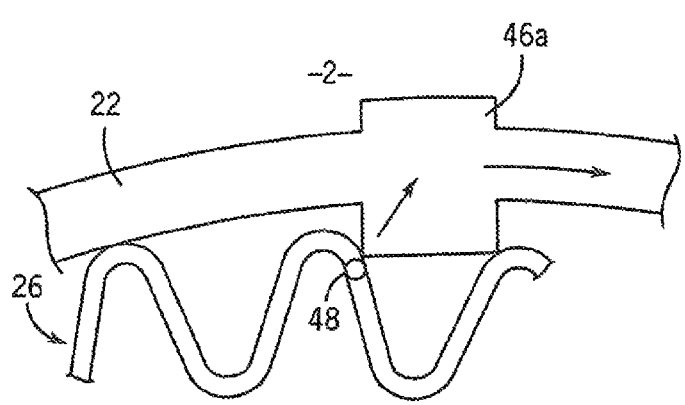

Referring to FIG. 3b, as the magnet ring 22 moves clockwise, for example, to a two-degree position with rotation of the shall 14, the magnetic particle 48 is drawn from the radially outward peak 27a of the perturbation 28a rightward (as depicted) and downward along the track 26 toward a radially inward trough 27b closer to the axis 16.

Figure 3C:
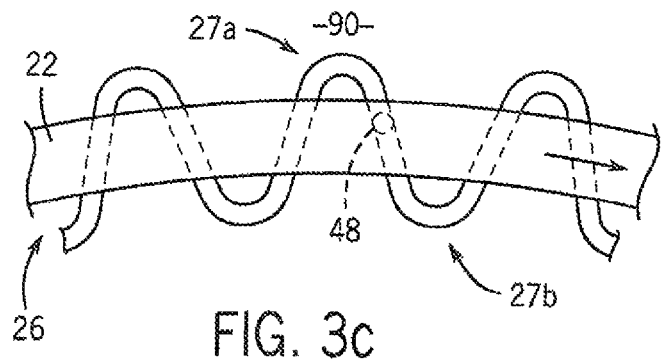
Figure 3D:
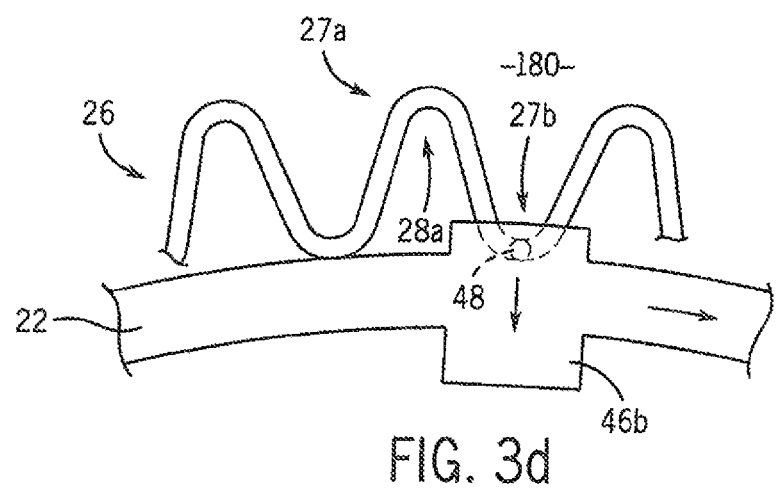

Referring to FIG. 3c, further rotation clockwise of the ring 22, for example, to the 90 degree position, moves the magnetic particle 48 further downward toward the trough 27b as the magnet ring 22 passes downward across the perturbations of the track 26 until (as shown in FIG. 3d) the magnetic particle 48 is pulled fully into the trough 27b held by the magnetic attraction of an opposite tooth 46b.

Figure 3E:
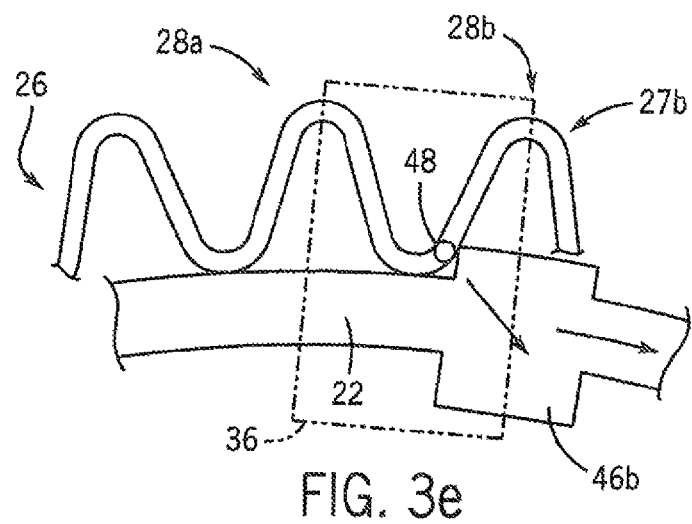

Further clockwise rotation of the magnet ring 22, as shown in FIG. 3e causes the magnetic particle 48 to move upward toward a peak 27a of perturbation 28b again into a new sensing location 36.

It will be appreciated that the magnetic particle 48 will arrive at the sensing location 36 of perturbation 28b after approximately 360 degrees of shaft rotation resulting in a movement rightward by one perturbation from a sensing location 36 of perturbation 28a to a sensing location 36 of perturbation 28b. It will likewise be appreciated that counterclockwise rotation of the shaft 14 will cause the reverse direction motion of the magnetic particle 48. In this way, it will be appreciated that the number of rotations of the shaft 14 in a given direction may be determined by monitoring movement of the magnetic particle 48 from one sensing location 36 to the next and that the number of rotations detectable is limited only by the number of perturbations within a full cycle of the track 26.

Figure 4:
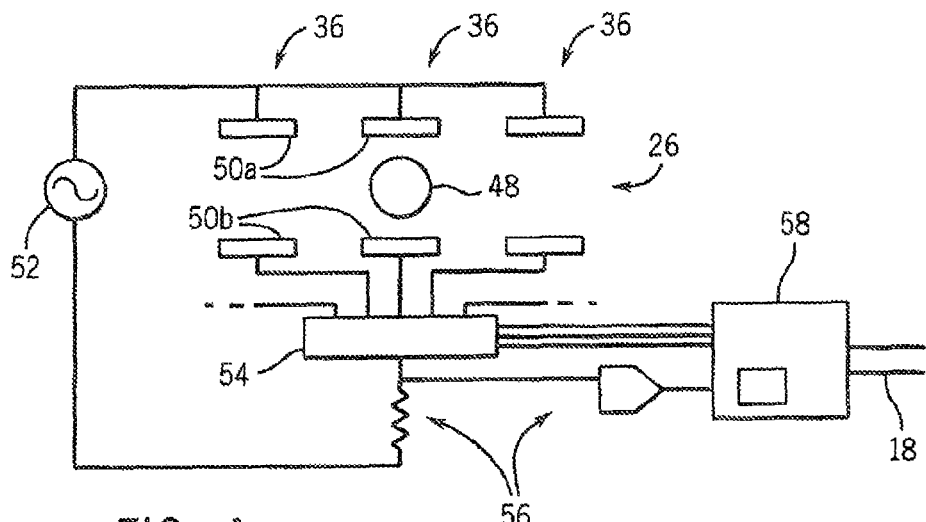
FIG. 4 is a schematic representation of a sensor system for sensing a location of the magnetic particle within the track.

Referring now to FIG. 4, a position of the magnetic particle 48 along the track 26 may be determined, for example, by placement of electrodes 50a and 50b on opposite sides of each sensing location 36 so as to flank the particle 48 when it is at the given sensing location 36. In one embodiment, electrodes 50a and 50b may electrically contact the particle 48 to measure a change of resistance between the electrodes 50a and 50b with the presence and absence of the magnetic particle 48. Noncontact electrical measurement, however, may be obtained by merely placing electrodes 50a and 50b in close proximity to the particle at each of the sensing locations 36 to measure change in electrical qualities of the circuit formed with electrodes 50a and 50b with the presence and absence of the particle 48. For example, a sinusoidal voltage from a voltage source 52 may be imposed across the electrodes 50a and 50b and changes in an AC impedance (inductance or capacitance) in a circuit so formed may be detected such as will change according to the presence or absence of the magnetic particle 48 to determine the presence or absence of the particle 48. Likewise, a magnetic hysteresis caused by the presence of the particle 48 in the environment of a changing magnetic field, for example, generated when electrodes 50*a* and 50*b* provide coil forms generating a magnetic field, may be detected.

In one embodiment each of the electrodes 50*a* be commonly driven and each of the electrodes 50*b* separately measured by being connected through a multiplexer 54 controlled by a microprocessor 58 to selectively connect one electrode 50*b* at a time to a sensing circuit 56. The sensing circuit 56 may measure changes in voltage or current or the like and may provide an input to the microprocessor 58, for example, via an analog-to-digital converter. Analysis of the signals from the sensing circuit 56 may thus be used to determine a location of the magnetic particle 48 along the track. This location, indicates the number of historical rotations of the shaft 14, may be output from the microprocessor 58 as an angular output signal through conductors 18.

Figure 5A:
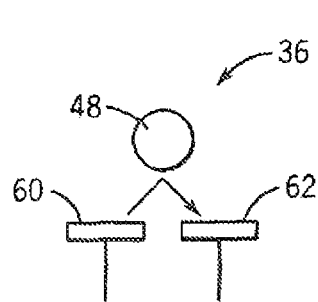
FIGS. 5a and 5b are fragmentary views of alternative embodiments of the sensors of the sensor system of FIG. 4.
Figure 5B:
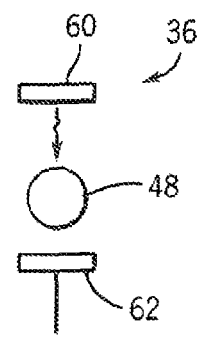

Referring to FIG. 5*a*, it will be appreciated that other sensing systems may be employed for detection of the position of the magnetic particle 48 including those having a photoemitter 60 that may project light upward into the sensing location 36 and reflected downward to a photodetector 62 when a magnetic particle 48 is in sensing location 36. The photodetector 62 may be connected to multiplexer 54 to permit measurement of the reflected light such as indicates the presence or absence of the magnetic particle 48. Similarly as shown in FIG. 5*b*, the photoemitter 60 and photodetector 62 may be placed on opposite sides of the particle 48 when in the sensing location 36 so as to detect the particle 48 when it blocks transmitted light energy from the photoemitter 60.

Figure 6:
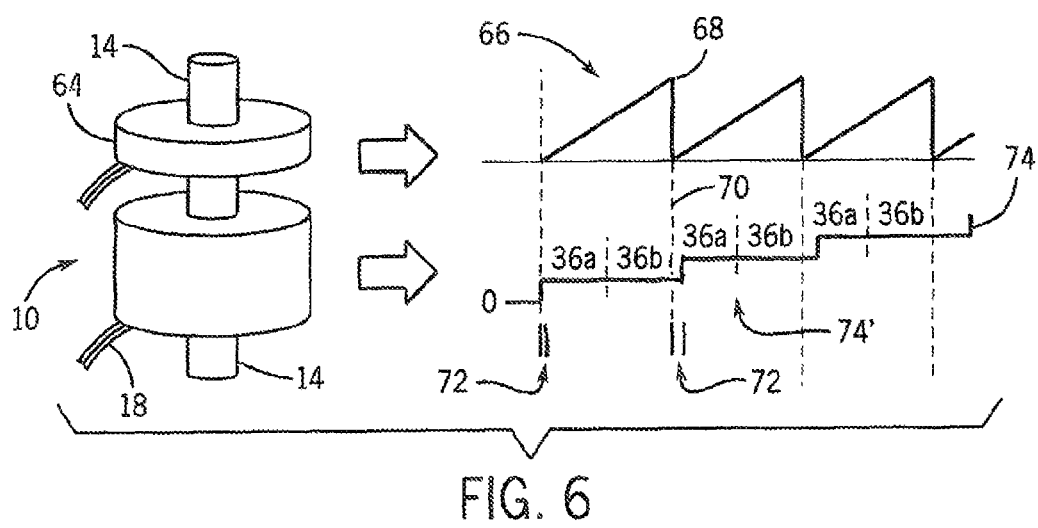
FIG. 6 is a an exploded perspective view of the rotation sensor of FIG. 1 linked to an absolute rotation sensor and showing relative signals from each and zones of uncertainty such as can be resolved with high-resolution sensing.

Referring now to FIG. 6, the multi-turn-counter rotation sensor of the present invention may be advantageously combined on a single shaft 14 with an absolute single-turn rotation sensor 64. This combination is advantageous if a single-turn function of the magnetic particle in serpentine track is not implemented or the inherent single turn resolution is not adequate. As will be understood to those of ordinary skill in the art, the single-turn rotation sensor 64 may be adjusted to provide an output signal 66 having a value of zero when the magnet ring 22 is in the zero position with respect to the track 26 (for example, as shown in FIG. 2) and to climb to a peak value after one full revolution of the shaft 14 before dropping back to the zero value again at a rollover angle 70 generally corresponding to the angular position of zero. The single-turn rotation sensor 64 may thus provide multiple output values that uniquely identify multiple angular positions within one rotation of the shaft 14 but may not indicate how many rotations of the shaft have occurred.

An output from the rotation sensor in this case can augment the signal from the single-turn rotation sensor 64 to provide an indication of how many rotations of the shaft have occurred. The rotation sensor provides for a generally rising turn-count signal 74 whose magnitude indicates total number of turns. The rising turn-count signal 74 will not have the exact period of the output signal 66, which is 360 degrees. If the whole track consists of N serpentine perturbations, the period of the turn-count signal is 360 (N+1)/N degrees. Because the magnetic particle 48 moves generally around the track 26 with each successive rotation of the axis 16, the angle of sensing of each next position of the magnetic particle 48 at a next sensing location 36 is delayed slightly after the rollover angle 70 by increasing amounts with increasing numbers of turns of the shaft 14. When the turn-count reaches N, the accumulated delay is 360 degrees, after which, both the turn counts and the single turn angle starts from 0 again and the whole process cycles.

This mismatch in periods creates a narrow uncertainty region 72 where two different positions of the shaft 14 are associated with identical values of the output signal 66 and identical values of the of the turn-count signal 74. Referring to FIG. 8, this ambiguity can be resolved by breaking each of the sensors 50*b* into two sensors, a first set of sensors 50*b* associated with an radial outer half of the track 26 and defining sensor locations 36*a* half the angular range of sensor location 36, and a second set of sensors 50*b*' associated with a radial inner half of the track 26 and defining sensor locations 36*b* also half angular range of sensor location 36. This finer resolution of sensing allows one of each adjacent pair of uncertainty regions 72 to be segregated always into sensing regions 36*b* and thus to be uniquely identified relative to the corresponding part of the uncertainty regions 72 which is offset by 360 degrees and which will be in sensing regions 36*a*.

Figure 7:
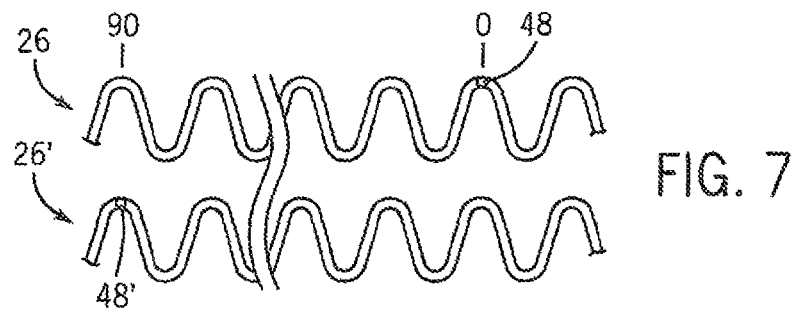
FIG. 7 is a schematic representation of two tracks providing two signals providing a greater range of rotation counting.

Referring now to FIG. 7 a second track 26' and a second magnetic particle 48', may be provided. A separate set of sensors may sense the position of the magnetic particle 48' in track 26'. The multiple tracks 26 and 26' can be used to substantially expand the number of rotations that the rotation sensor 10 may track to number far beyond the number of serpentine cycles of the tracks 26 and 26' by giving each of the tracks a different number of cycles. Thus for example if track 26 can count up to 7 turns (in a greatly simplified example) before repeating, and track number 26' can count up to nine turns. The combination of the two allows the rotation sensor 10 to count 7×9=63 turns. That is the magnetic particles 48 and 48' will only return to the same positions every 63 turns. Of course if large prime numbers are used for the number of cycles (for example 89 and 97) this effect can be greatly increased (for example allowing 8633 rotations before the pattern repeats). In general, the least common multiple of the numbers of the serpentine units from all tracks provide the maximum turn-counts of the system.

Figure 9:
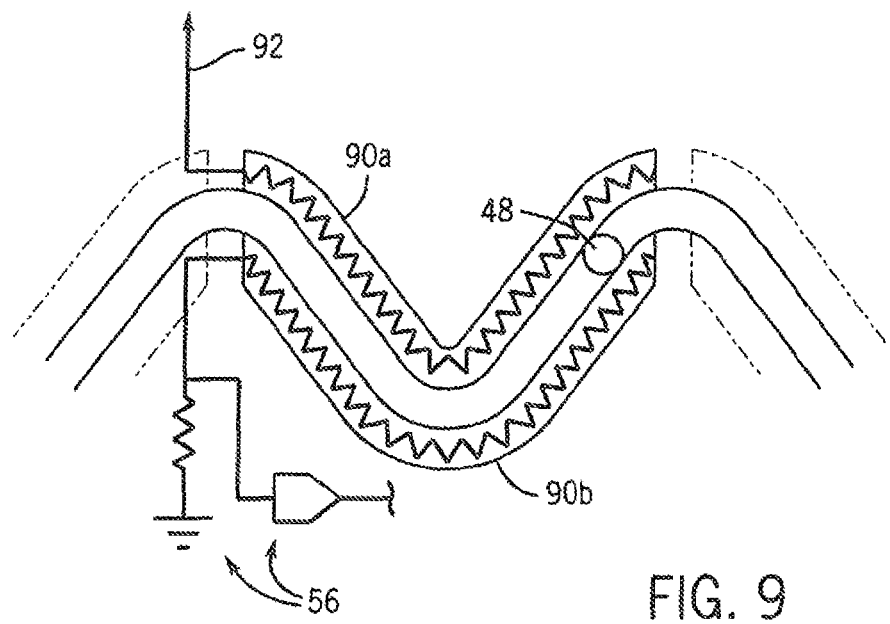
FIG. 9 is a figure similar to FIG. 8 showing the use of the resistive sensors that provide a continuous indication of movement of the magnetic particle along the serpentine track for higher resolution measurements.

Referring now to FIG. 9, intra-turn angular resolution can also be obtained, for example, by constraining an electrically conductive magnetic particle 48 between two resistive tracks 90*a* and 90*b* which provide walls of the tracks 26. Current flowing from resistive track 90*a* from a voltage source 92 through the magnetic particle 48 to be received by resistive track 90*b* will experience a varying resistance depending on the position of the magnetic particle 48 along the track 26. This resistance may be measured by sensing circuit 56 to provide a continuous measurement of rotational position with a finer resolution than single turns.

The further the magnetic particle 48 moves inward along the track 26, the more resistance will be measured. This technique may be combined with discrete position sensors discussed above and it will be appreciated that there are other methods to provide continuous position measurement as well.

It is noted that there need only be relative rotation between the magnet ring 22 and the track 26 and therefore that either can be fixed with respect to the housing 12 or attached to the shaft 14. The shape of the track 26 need not be sinusoidal and it will be appreciated that sawtooth or square tooth type perturbations may also be used. The shape of the magnetic ring may not be strictly circular, elliptical or other similar shape may also be used. The word "magnetic" may indicate either a ferromagnetic material that does not generate its own magnetic field or a material generating a magnetic field in the manner of a permanent magnet and should be interpreted according to context.

It will be understood that the present invention is applicable to a wide variety of applications and can replace conventional encoders, resolvers, eddy current sensors, and even operate in the context of sensorless motor to replace a two pole resolver over a limited angular range.

Certain terminology is used herein for purposes of reference only, and thus is not intended to be limiting. For example, terms such as "upper", "lower", "above", "below", "inside", and "outside" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. It is understood that the processors described herein can hold programs holding data in non-transient medium for execution on the processors according to the steps described above It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A rotation sensor comprising:
   a housing adapted to receive a shaft within the housing to rotate about an axis;
   a magnetic particle;
   a track constraining the magnetic particle for movement therealong and positioned about the axis, the track providing a periodic variation in radius with respect to the axis so that the magnetic particle moving through the track about the axis moves closer to and further from the axis with such movement;
   a permanent magnet positioned adjacent to the track;
   wherein:
      one of the track and the permanent magnet are attached to the shaft so that the track and the permanent magnet rotate relative to each other about the axis;
      rotation of the track and the permanent magnet relative to each other thereby presents to the magnetic particle a magnetic field having a component oscillating radially with respect to the axis; and
      the component of the magnetic field oscillating radially with respect to the axis causes the magnetic particle to advance a predetermined amount along the track with each rotation of the shaft; and
   a sensor system identifying a location of the magnetic particle along the track to output a number of turns of the shaft according to the location of the magnetic particle along the track.

2. The rotation sensor of claim 1 wherein the permanent magnet is a magnetic ring mounted eccentrically with respect to the track so that a portion of the magnetic ring passes from a radially outboard position to a radially inward position with respect to a given location on the track as the shaft rotates.

3. The rotation sensor of claim 1 wherein the permanent magnet provides periodically extending radial teeth exerting a tangential force on the magnetic particle in the track when the teeth pass the magnetic particle with rotation of the shaft.

4. The rotation sensor of claim 1 wherein the magnetic particle is selected from the group consisting of a ferromagnetic bead, a droplet of ferrofluid, and a droplet of ferrofluid surrounding a magnetized bead.

5. The rotation sensor of claim 1 wherein the track is a substantially sinusoidal path along a circle lying in a plane perpendicular to the axis.

6. The rotation sensor of claim 1 wherein the sensor system uses sensors selected from the group consisting of optical, resistive, capacitive, and inductive sensors.

7. The rotation sensor of claim 5 wherein the sensor system uses noncontact electrical field sensors.

8. The rotation sensor of claim 1 further including a second magnetic particle and a second track constraining the second magnetic particle and concentric with the first track, the second track providing a serpentine periodic variation in radius from the axis so that the second magnetic particle moving to the second track about the axis moves closer to and further from the axis with such movement;
   wherein the sensor system identifies a location of the second magnetic particle along the second track to reveal a number of turns of the shaft according to a position of the second magnetic particle along the second track.

9. The rotation sensor of claim 8 wherein the second magnetic particle is angularly displaced from the magnetic particle.

10. The rotation sensor of claim 8 wherein the number of serpentine periodic variations in the first and second tracks are different to increase a number of turns of the rotation sensor shaft providing a unique output according to a least common multiple of the different numbers of serpentine periodic variations.

11. The rotation sensor of claim 1 wherein the sensor system provides an electrical output connector providing a signal indicating a number of rotations of the shaft.

12. The rotation sensor of claim 1 wherein the sensor system provides electrical output providing a signal differentiating at least two angular positions of the shaft within a range of 360 degrees.

13. The rotation sensor of claim 1 wherein the sensor system provides a continuous output value indicating the location of the magnetic particle along the radial guide.

14. The rotation sensor of claim 12 further including an absolute rotation sensor attachable to the shaft for providing an indication of a plurality of angular positions within a range of 360 degrees of shaft rotation.

15. The rotation sensor of claim 1 wherein the permanent magnet is mounted to rotate with the shaft.

16. The rotation sensor of claim 1 wherein the sensor system provides periodic sensor elements at locations associated with each periodic variation in the radius of the track to identify a location of the magnetic particle at any of such location.

17. The rotation sensor of claim 1 wherein the sensor system provides continuous measurement of the location of the magnetic particle along the track.

18. The rotation sensor of claim 1 wherein the track is a channel constraining the magnetic particle to move along the channel.

19. The rotation sensor of claim 1 wherein when the shaft is fixed in position, the magnetic particle is stably held in a single location along the track by a magnetic field.

20. A method of measuring absolute rotational turns employing a rotation sensor having:

a housing adapted to receive a shaft within the housing to rotate about an axis;

a magnetic particle;

a track constraining the magnetic particle from movement therealong and positioned about the axis, the track providing a periodic variation in radius with respect to the axis so that the magnetic particle moving through the track about the axis moves closer to and further from the axis with such movement;

a permanent magnet;

wherein one of the track and the permanent magnet are attached to the shaft to rotate relative to each other about the axis thereby presenting to the magnetic particle a magnetic field oscillating radially with respect to the axis causing the magnetic particle to advance a predetermined amount along the track with each rotation of the shaft; and a sensor system identifying a location of the magnetic particle along the track;

the method comprising:

(a) rotating the shaft to generate rotation of the track and the permanent magnet relative to each other;

(b) causing the magnetic particle to move along the track as a function of the magnetic field oscillating radially with respect to the axis; and (c) sensing the location of the magnetic particle to reveal a number of turns of the shaft according to a position of the magnetic particle along the track.

\* \* \* \* \*